United States Patent
Mattes et al.

(10) Patent No.: US 6,755,274 B2
(45) Date of Patent: Jun. 29, 2004

(54) METHOD FOR DETECTING ROLLOVER OCCURRENCES IN A MOTOR VEHICLE

(75) Inventors: Bernhard Mattes, Sachsenheim (DE); Hans-Walter Schmitt, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/122,267

(22) Filed: Apr. 11, 2002

(65) Prior Publication Data

US 2002/0175016 A1 Nov. 28, 2002

(51) Int. Cl.$^7$ .......................... B60K 28/14; B62D 49/08
(52) U.S. Cl. ........................ 180/282; 280/735; 701/45
(58) Field of Search ................... 180/274, 282; 280/734, 735; 200/61.46; 701/36, 45, 46, 47, 70, 72; 340/669, 429, 440

(56) References Cited

U.S. PATENT DOCUMENTS

| | | | |
|---|---|---|---|
| 5,602,734 A | * 2/1997 | Kithil | 701/45 |
| 6,002,975 A | 12/1999 | Schiffmann et al. | 701/36 |
| 6,100,797 A | * 8/2000 | Mattes et al. | 340/437 |
| 6,141,604 A | * 10/2000 | Mattes et al. | 701/1 |
| 6,282,474 B1 | * 8/2001 | Chou et al. | 701/45 |
| 6,311,112 B1 | * 10/2001 | Mazur et al. | 701/45 |
| 6,315,074 B1 | * 11/2001 | Achhammer et al. | 180/282 |
| 6,390,498 B1 | * 5/2002 | Francis et al. | 280/735 |
| 6,433,681 B1 | * 8/2002 | Foo et al. | 340/440 |
| 6,529,811 B2 | * 3/2003 | Watson et al. | 701/45 |

FOREIGN PATENT DOCUMENTS

| | | |
|---|---|---|
| DE | 197 44 085 | 4/1999 |
| DE | 198 14 154 | 10/1999 |
| DE | 198 28 338 | 12/1999 |
| EP | 965 502 | 12/1999 |
| EP | 100 10 633 | 9/2001 |

* cited by examiner

Primary Examiner—Paul N. Dickson
Assistant Examiner—Laura B. Rosenberg
(74) Attorney, Agent, or Firm—Kenyon & Kenyon

(57) ABSTRACT

A method for detecting rollover occurrences in a motor vehicle and activating appropriate restraining devices, the rate of rotation of the vehicle about at least one axis of rotation, in particular its longitudinal axis and/or its transverse axis, being measured with the aid of at least one rotation-rate sensor, and evaluated. The translational acceleration of the vehicle is considered in evaluating the rotation-rate sensor signal, in order to prevent malfunctions of the rotation-rate sensor caused by extreme translational accelerations from erroneously triggering restraining devices for a rollover event.

12 Claims, 1 Drawing Sheet

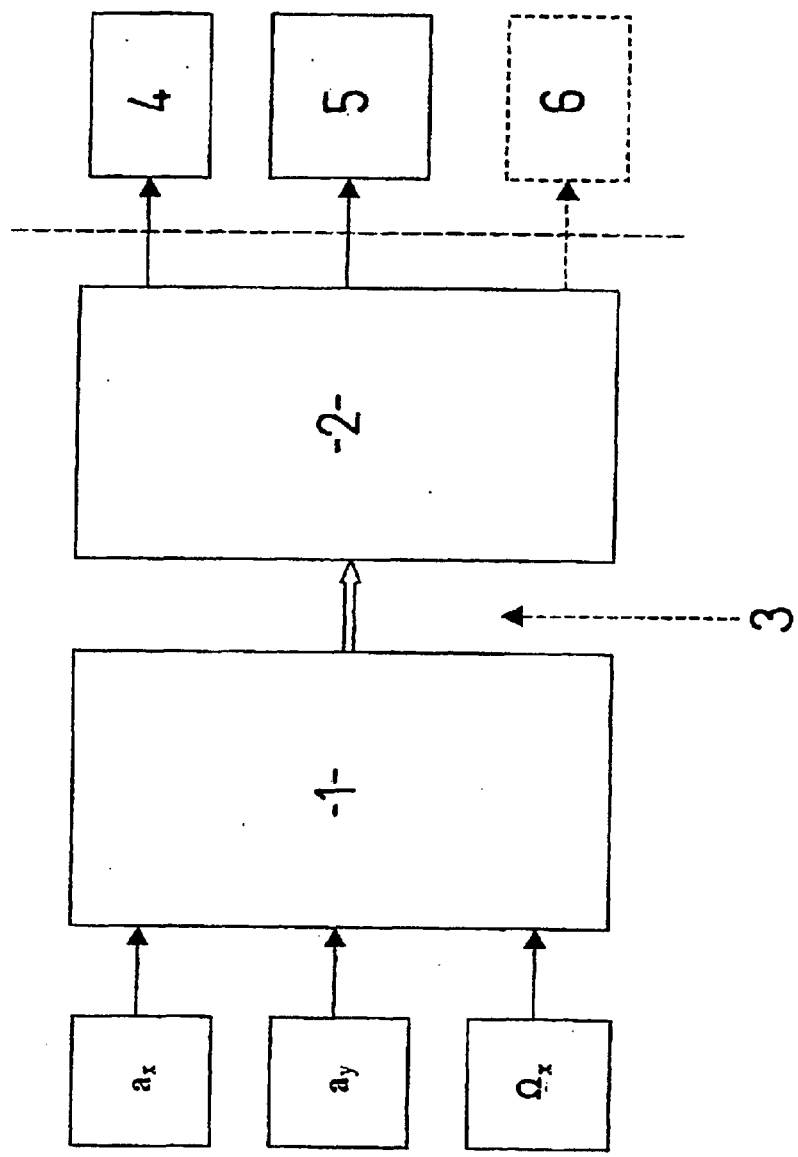

METHOD FOR DETECTING ROLLOVER OCCURRENCES IN A MOTOR VEHICLE

FIELD OF THE INVENTION

The present invention relates to a method for detecting rollover occurrences in a motor vehicle and triggering appropriate restraining devices, the rate of rotation of the vehicle about at least one axis of rotation, in particular its longitudinal axis and/or its transverse axis, being measured with the aid of at least one rotation-rate sensor, and evaluated.

BACKGROUND INFORMATION

In practice, micromechanical or surface-micromechanical sensors, which function according to the tuning-fork principal or to a linear or rotational oscillation principle, are preferably used as rotation-rate sensors.

Rotation-rate sensors that function according to the rotational oscillation principle measure the Coriolis acceleration, which acts on the sensor mass due to a rotational movement of the vehicle. The following comparison between a measurement of the translational acceleration and a measurement of the Coriolis acceleration by surface-micromechanical sensors, whose sensor masses are each $2 \times 10^{-6}$ grams, shows that the Coriolis acceleration is a relatively small physical effect.

In the case of a translational acceleration of 3 g, which corresponds to the resolution limit of an 8-bit analog-digital converter, the force acting on the sensor mass of the acceleration sensor is approximately $60 \times 10^{-10}$ Newtons. In contrast, the Coriolis force acting on the edge of the sensor mass in response to an angular acceleration of 3°/s, which also corresponds to the resolution limit of an 8-bit analog-digital converter, is approximately $4 \times 10^{-10}$ Newtons. Therefore, the minimum force to be measured in a rotation-rate sensor based on the rotational-oscillation principle is approximately 15 times smaller than in the case of an acceleration sensor having the same sensor mass. Thus, such rotation-rate sensors must be designed to measure minimal forces.

Translational accelerations, which, e.g. occur in crash situations, may cause mechanical vehicle resonances, which considerably interfere with the functioning of the above-described rotation-rate sensors. In crash situations, in particular, the situation can occur in which the output signal of the rotation-rate sensor incorrectly indicates a rollover situation, and restraining devices are therefore triggered, which are not useful in the actual accident situation and may even constitute an additional injury risk to the vehicle occupants.

SUMMARY OF THE INVENTION

The present invention provides that the translational acceleration of the vehicle be considered in evaluating the rotation-rate sensor signal, in order to prevent malfunctions of the rotation-rate sensor caused by extreme translational accelerations from erroneously triggering restraining devices for a rollover event.

In the case of the present invention, it is recognized that, in a crash which may cause the rotation-rate sensor to malfunction, relatively large translational accelerations always occur, while such large translational accelerations do not occur in the case of a rollover event. In addition, it is recognized that, in the case of a crash, acceleration components always occur along all three main axes of the vehicle. In order to implement the method of the present invention, it is therefore already sufficient to measure just one of the acceleration components, i.e. to measure the translational acceleration in only one direction. Since airbag control units are usually equipped with acceleration sensors for detecting longitudinal and lateral impact, the method of the present invention may advantageously use the present hardware and evaluate the output signals of these acceleration sensors. Consequently, the present invention's method for detecting rollover occurrences may easily be integrated into the airbag control unit, as well.

In principle, the translational acceleration measured within the scope of the method according to the present invention may be meaningfully considered in different ways, in the evaluation of the measured rate of rotation.

In one variant of the method according to the present invention, the measured translational acceleration is used to check if a crash situation exists, which could impair the functionality of the rotation-rate sensor. For this purpose, one may simply define a threshold value for the translational acceleration. Then, when the measured translational acceleration is greater than this threshold value, it is always assumed that a crash situation is present, which, in turn, is considered while evaluating the rate of rotation measured concurrently.

In a particularly advantageous variant of the method according to the present invention, the output signal of the rotation-rate sensor, i.e. the measured rate of rotation, is at least ignored for a predetermined period of time, when it is assumed, on the basis of the measured translational acceleration, that a crash situation exists, i.e. when, for example, the simultaneously measured translational acceleration of the vehicle is greater than a predetermined threshold value. Since high translational accelerations do not normally occur during rollover events, the possibility of a rollover event here is simply excluded from the beginning, regardless of the output signal of the rotation-rate sensor. In this manner, restraining devices unsuitable for the actual situation may be reliably prevented from being erroneously activated.

BRIEF DESCRIPTION OF THE DRAWING

The FIGURE shows a block diagram for illustrating the present invention's method, which is integrated into an airbag control unit in an exemplary embodiment.

DETAILED DESCRIPTION

Referring to the FIGURE, the airbag control unit includes a microprocessor 1, which receives different sensor signals for purposes of evaluation. In this case, microprocessor 1 thus receives output signals $a_x$ and $a_y$ of two acceleration sensors, which measure the vehicle's translational accelerations parallel to its longitudinal axis and parallel to its transverse axis. Longitudinal and lateral crash situations may be detected by evaluating signals $a_x$ and $a_y$. In the case of a crash situation, an appropriate algorithm is started in order to trigger suitable restraining devices, which are then controlled with the aid of an output-stage ASIC 2 that is connected to microprocessor 1 via a serial interface 3. Thus, e.g. in the event of the side collision, belt tighteners 4 and impact-side side airbags 5 for the thorax and head are activated by the side-impact algorithm running in microprocessor 1.

As previously mentioned, the exemplary embodiment explained here provides for the present invention's method for detecting rollover events and triggering appropriate restraining devices being integrated into the airbag control unit. In order to detect rollover events, rotation rate $\Omega_x$ of the vehicle about an axis of rotation, in this case its longitudinal axis, is measured with the aid of a rotation-rate sensor and transmitted to microprocessor 1. According to the present invention, translational acceleration $a_x$ and/or $a_y$ is considered in the evaluation of measured rate of rotation $\Omega_x$. In the present case, the translational accelerations $a_x$ and $a_y$ already measured for detecting longitudinal and lateral impact are simply used for evaluating rate of rotation $\Omega_x$, as well. In this case, it is not necessary to separately measure translational accelerations $a_x$ and $a_y$ for the method of the present invention alone.

Using measured translational accelerations $a_x$ and $a_y$, it is now checked if a crash situation exists, which could impair the functioning of the rotation-rate sensor. To this end, each translational acceleration $a_x$ and $a_y$ is compared to a predetermined threshold value. If translational accelerations $a_x$ and $a_y$ are above their respective threshold values, it is then assumed that a crash situation exists. In this case, the output signal of the rotation-rate sensor, i.e. measured rate of rotation $\Omega_x$, is at least ignored for a predefined period of time, even when output signal $\Omega_x$ of the rotation-rate sensor signals a rollover situation.

The method of the present invention even gives the side-impact algorithm a higher priority than the rollover algorithm in the case of a side collision with a subsequent rollover, since the rollover algorithm for activating appropriate retaining devices, such as roll bar 6, may not be started during the predefined time period. However, this prioritization generally proves to be advantageous, for, in the case of a side collision with a subsequent rollover event, the side-impact algorithm already triggers belt tighteners 4 and impact-side side airbags 5, which also would be activated in the case of a corresponding rollover event. Therefore, it is not important that output signal $\Omega_x$ of the rotation-rate sensor is suppressed for a certain period of time. In contrast, the rollover algorithm can correctly activate the appropriate retaining devices in response to a side collision, which is irrelevant with regard to triggering, i.e. weak, and leads to a rollover event, since output signal $\Omega_x$ of the rotation-rate sensor is not ignored in this case, but is rather evaluated. In other crash situations that impair the functioning of the rotation-rate sensor, erroneous activation of the restraining devices for the rollover event may be prevented in a simple and reliable manner by ignoring measured rate of rotation $\Omega_x$.

Finally, it should be noted that, in order for the above-described method of the present invention to be efficient, it is important for the threshold values of translational accelerations $a_x$ and $a_y$ and the duration of the interval of disregard, i.e. the time period in which output signal $\Omega_x$ of the rotation-rate sensor is ignored, to be selected correctly.

What is claimed is:

1. A method for detecting rollover occurrences in a motor vehicle and triggering appropriate restraining devices in the vehicle, the method comprising:

measuring a translational acceleration of the vehicle in at least one direction;

measuring a rate of rotation of the vehicle about at least one axis of rotation, using at least one rotation-rate sensor; and evaluating the measured rate of rotation of the vehicle as a function of the measured translational acceleration.

2. The method according to claim 1, further comprising checking if a crash situation exists which could impair a functioning of the rotation-rate sensor, using measured translational accelerations.

3. The method according to claim 1, further comprising checking if the measured translational acceleration is greater than a predetermined threshold value for a crash situation.

4. The method according to claim 1, wherein the at least one axis of rotation includes at least one of a longitudinal axis and a transverse axis of the vehicle.

5. The method according to claim 1, wherein it is determined whether the measured rate of rotation may be affected as a result of the translational acceleration.

6. A method for detecting rollover occurrences in a motor vehicle and triggering appropriate restraining devices in the vehicle, the method comprising:

measuring a translational acceleration of the vehicle in at least one direction;

measuring a rate of rotation of the vehicle about at least one axis of rotation, using at least one rotation-rate sensor;

evaluating the measured rate of rotation of the vehicle as a function of the measured translational acceleration;

checking if a crash situation exists which could impair a functioning of the rotation-rate sensor, using the measured translational acceleration; and ignoring an output signal of the rotation-rate sensor for at least a predefined period of time, when it is assumed that a crash situation exists, based on the measured translational acceleration, wherein the output signal of the rotation-rate sensor is the measured rate of rotation.

7. A control unit for detecting rollover events in a motor vehicle and for activating restraining devices in the vehicle, the control unit comprising:

means for measuring a translational acceleration of the vehicle in at least one direction;

means for measuring a rate of rotation of the vehicle about at least one axis of rotation, using at least one rotation-rate sensor; and means for evaluating the measured rate of rotation of the vehicle as a function of the measured translational acceleration.

8. The control unit according to claim 7, wherein the at least one axis of rotation includes at least one of a longitudinal axis and a transverse axis of the vehicle.

9. The control unit according to claim 7, wherein it is determined whether the measured rate of rotation may be affected as a result of the translational acceleration.

10. The control unit according to claim 9, wherein the at least one axis of rotation includes at least one of a longitudinal axis and a transverse axis of the vehicle.

11. A control unit for detecting rollover events in a motor vehicle and for activating restraining devices in the vehicle, the control unit comprising:

a translational acceleration measuring arrangement to measure a translational acceleration of the vehicle in at least one direction;

a rate of rotation measuring arrangement to measure a rate of rotation of the vehicle about at least one axis of rotation, using at least one rotation-rate sensor; and an evaluating arrangement to evaluate the measured rate of rotation of the vehicle as a function of the measured translational acceleration to determine whether the measured rate of rotation may be affected as a result of the translational acceleration.

12. The control unit according to claim 11, wherein the at least one axis of rotation includes at least one of a longitudinal axis and a transverse axis of the vehicle.

* * * * *